United States Patent
Durschlag

(10) Patent No.: US 12,551,435 B2
(45) Date of Patent: *Feb. 17, 2026

(54) DELIVERY OF LIQUID COMPOSITION AND OXYGEN

(71) Applicant: BOA Refinance Corp, LLC, Jackson, MS (US)

(72) Inventor: Maurice E. "Hank" Durschlag, Jackson, MS (US)

(73) Assignee: BOA Refinance Corp, LLC, Jackson, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,534

(22) Filed: Jun. 13, 2022

(65) Prior Publication Data

US 2022/0409534 A1 Dec. 29, 2022

Related U.S. Application Data

(60) Provisional application No. 63/209,816, filed on Jun. 11, 2021, provisional application No. 63/209,752, filed on Jun. 11, 2021.

(51) Int. Cl.
*A61K 9/12* (2006.01)
*A61K 9/00* (2006.01)

(52) U.S. Cl.
CPC .............. *A61K 9/124* (2013.01); *A61K 9/006* (2013.01)

(58) Field of Classification Search
CPC ................................. A61K 9/124; A61K 9/006
See application file for complete search history.

(56) References Cited

U.S. PATENT DOCUMENTS

2002/0150657 A1* 10/2002 Farr ..................... B65D 83/565
426/115
2021/0032010 A1 2/2021 Sebastian et al.

FOREIGN PATENT DOCUMENTS

DE      10 2008 031 415    12/2009
WO      WO 20250152889     * 11/2021
WO      WO 2022/261535     12/2022

OTHER PUBLICATIONS

Aungst (absorption enhancers AAPS J. (2011) 14(1); 10-18.*
Amazon.com, Oxygize Portable oxygen can canister with mask for home breathe trekking patient gas travel cylinder asthma 10 liter medical cannister cans personal health outdoor 10 liter patients hospital natural, Date first available: Oct. 17, 2020 [retrieved on Sep. 14, 2022] Retrieved from the internet: <URL: https://www.amazon.in/Oxygize-Peppermint-Supplement-Increases-Performance/dp/B08LC867CP>.
Gary, BOA Nutrition becomes 'exclusive performance salt blast' of USA Triathlon, endurance.biz, Aug. 4, 2021 [retrieved on Sep. 14, 2022]. Retrieved from the internet: <URL: https://endurance.biz/2021/industry-news/boa-nutrition-becomes-exclusive-performance-salt-blast-of-USA-triathlon/>.
PCT Application No. PCT/US2022/033223, International Search Report and Written Opinion dated Oct. 12, 2022.
PCT Application No. PCT/US2022/033223, International Preliminary Report on Patentability dated Dec. 21, 2023.

* cited by examiner

*Primary Examiner* — Shirley V Gembeh
(74) *Attorney, Agent, or Firm* — Polsinelli LLP

(57) ABSTRACT

The present invention provides a system, a kit and a use thereof for oral mucosa delivery of a composition. The composition may comprise at least two sub-compositions admixed right before dispensing to the oral mucosa. In one embodiment, the system is a pressurized system. In another embodiment, the admixed sub-compositions are atomized. In one embodiment, one of the sub-compositions comprise a beneficiary gas, such as oxygen. In another embodiment, one of the sub-compositions comprise a nutritional supplement, a nutraceutical composition, a pharmaceutical composition, or any combinations thereof.

20 Claims, 5 Drawing Sheets

DELIVERY OF LIQUID COMPOSITION AND OXYGEN

CROSS-REFERENCE TO RELATED APPLICATIONS

The present disclosure claims the priority benefit of U.S. provisional patent application No. 63/209,752 filed Jun. 11, 2021 and U.S. provisional patent application No. 63/209,816 filed Jun. 11, 2021, the disclosures of which are incorporated by reference herein.

BACKGROUND OF THE INVENTION

1. Field of the Disclosure

The present disclosure is generally related to oral mucosa delivery of a composition, specifically the delivery system, kit and use thereof.

2. Description of the Related Art

Athletes may experience excessive fluid loss during intense exercise, which leave them with acute electrolyte deficiency in addition to dehydration. Low levels of electrolytes in the system can lead to cramping. To overcome the above issues, athletes may be given oral salt pills to compensate the acute electrolyte and salt loss. This approach may result in the over-supply of sodium. It also has the disadvantage of slow absorption through the GI tract. A mechanism for delivering a smaller dose of electrolytes to the buccal mucosa may provide the necessary electrolytes with more rapid bioavailability.

During exercise, more oxygen is needed than when the body is at rest. When oxygen cannot be delivered to the muscles faster to replace the used oxygen, the muscles will begin to convert the available glucose to lactic acid. Lactic acid will build up in the muscle, causing fatigue. A rapid delivery of oxygen to the muscles may reduce such fatigue.

Transmucosal delivery of nutrient supplements offers advantages over oral delivery when oral delivery is impossible or being negatively impacted by the issues in the gastrointestinal tract, stomach, substance digestion and absorption, swallowing, or other gastrointestinal metabolism problems.

SUMMARY OF THE CLAIMED INVENTION

The present invention provides systems for mucosa delivery of a composition. The present invention also present kits and uses thereof. In one embodiment, the system comprises a canister housing a pressurized gas and at least one sub-composition. In another embodiment, the system further comprises a valve and/or a nozzle. In one embodiment, the nozzle activation may atomize the sub-composition. In yet another embodiment, the canister dispenses at least a portion of the pressurized gas in an atomized mixture with the sub-composition. The composition may be in a compressed state in a canister before being dispensed.

In one embodiment, the canister houses at least one chamber or at least two chambers, wherein the sub-composition is housed separately from the pressurized gas. The pressurized gas may comprise oxygen. The pressurized gas may contain up to 95% oxygen and other gases, such as nitrogen and helium. The sub-composition may comprise one or more of a nutritional fraction, a gas fraction, an enhancer fraction, a liquid fraction, or a preservative fraction. The sub-composition may be a liquid, a suspension, an emulsion, a solution. The sub-composition may comprise a nutritional composition, a micronutrient composition, a nutraceutical composition, a pharmaceutical composition a food composition, or any combinations thereof.

In yet another embodiment, the system comprises a canister housing at least two sub-compositions. And the system further comprises a nozzle and at least one valve. In one embodiment, the nozzle activation may atomize one or both of the sub-compositions. In yet another embodiment, the canister comprises at least two chambers, and wherein the at least two sub-compositions are housed separately. The two sub-compositions may be admixed through the nozzle activation.

In one embodiment, one of the at least two sub-compositions may comprise a gas fraction, a flavoring fraction, a nutrition fraction, an enhancer fraction, or a preservative fraction. And the gas fraction may comprise oxygen. The at least two sub-composition may be in a compressed state before being dispensed.

BRIEF DESCRIPTIONS OF THE DRAWINGS

DETAILED DESCRIPTION

Figure 1:
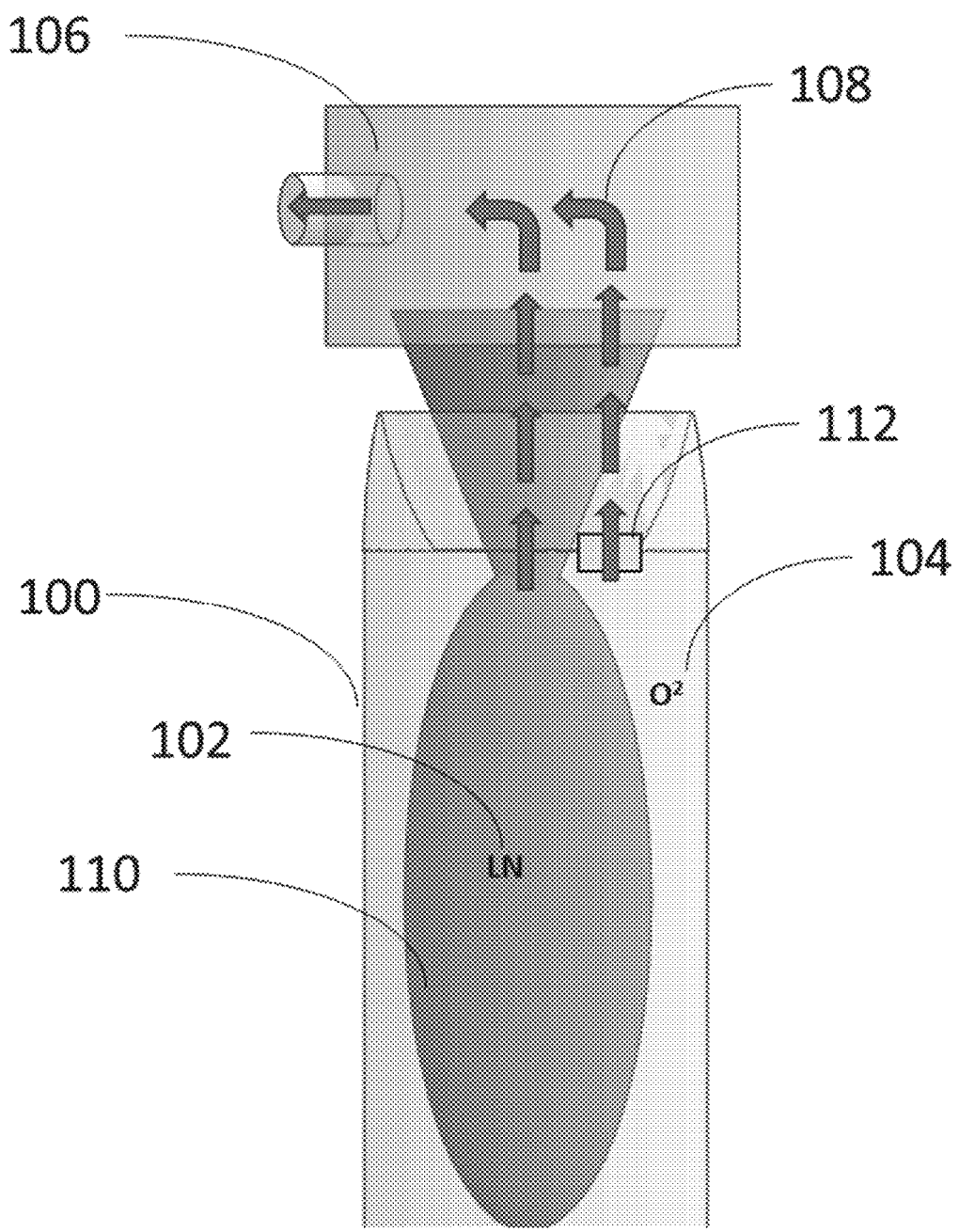
FIG. 1 illustrates a system for mucosa delivery of a liquid composition and oxygen according to one embodiment of the present invention.

The present invention provides an oral mucosa delivery system capable of delivery a nutritional composition together with a beneficial gas or other compositions. The delivery system may comprise a canister, a valve and a nozzle. The disclosed system may be suitable for delivering athletic supplements. For instance, the quick-mucosa delivery facilitates supplements' absorption and reduces first-pass effects. The system can also provide a longer duration of nutrient release than traditional methods, such as sports drinks or other orally ingested nutritional supplements.

The composition delivered by the invented system may comprise sub-composition, and each composition and sub-composition may any one or more of (i) a nutritional supplement matrix fraction, (ii) a gas fraction, (iii) an enhancer fraction, (iv) a liquid fraction, or (v) a preservative fraction. The nutritional supplement matrix fraction, the enhancer fraction, the liquid fraction, and the preservation fraction may be all mixed or combined and stored separately from the gas fraction in a canister before being dispensed. Such composition and sub-composition may allow oxygen suspended therein for a specific duration of time before being dispensed from a canister. Furthermore, the composition and/or sub-composition may be in a compressed state in a canister before being dispensed. The composition and/or sub-composition may be atomized before or after being dispensed, in order to maximize mucosal absorption.

The nutritional supplement matrix used herein can be any combination of electrolytes, vitamins, or minerals. Furthermore, the healthy supplement matrix may be selected from or be a combination of Potassium chloride, Sodium chloride, Iron, Sodium, Calcium, Magnesium, Carbohydrates, Proteins, Zinc, Molybdenum, Caffeine, Copper, Potassium, Manganese, Chlorides, Bicarbonate, and Carbonate, Aluminum, Arsenic, Bromine, Cadmium, Chromium, Sodium, Potassium, Chlorine, Cobalt, Fluorine, Iodine, Citicoline, Tyrosine Phenylalanine, Taurine, Malic Acid, Glucuronolactone, Manganese, Molybdenum Nickel, Phosphorus, Selenium, Silicon, Vanadium, Amino Acids, Vitamin A, Vitamin D, Vitamin E, Vitamin K, Vitamin C, Vitamin B complex, Thiamine (Vitamin 31), Riboflavin (Vitamin 132). Niacin (Vitamin B3), Pyridoxine (Vitamin B6), Biotin, Pantothenic Acid and Pantetheine, Folic Acid, Vitamin B12, "Unofficial" B Vitamins including Choline and Inositol, Vitamin P (bioflavonoids), and flavoring agents, and other vital nutrients, in addition to various homeopathic/alternative substances. In one embodiment, the formulation or composition of nutritional supplement matrix comprises 50 to 60 weight % of Chloride, where the Chloride is from potassium chloride and sodium chloride; 30 to 40 weight % of Sodium, where the Sodium is from sodium chloride; and 5 to 15 weight % of Potassium where the Potassium is from potassium chloride.

The gas fraction used herein comprises ambient air, oxygen, nitrogen or helium. The gas fraction maybe in a compressed state in the canister or in a chamber housed in the canister. In one embodiment, the gas fraction comprises oxygen, wherein the concentration of oxygen is up to 95% oxygen and can mix with other gases such as nitrogen.

The enhancer fraction used herein comprise a mucoadhesive enhancer, an absorption enhancer, and/or a flavoring agent. The mucoadhesive enhancer may comprise a pectin or an apple pectin. The absorption enhancer may be a glycerin or a vegetable glycerin. The flavoring agent may comprise various natural or artificial flavoring agents, allowable to be used in food, nutraceuticals, or pharmaceuticals.

The liquid fraction used herein comprises water, distilled water, filtered water, saline, buffer, or any water-based solutions. The amount of water is sufficient to dissolve all elements in the fraction and prevent precipitating.

The preservative fraction used herein comprise various food-grade or medical-grade preservatives, such as potassium sorbate. The food preservative fraction helps maintain and extend the shelf life of the composition or the sub-compositions.

Transmucosal delivery offers advantages over oral delivery when oral delivery is impossible or negatively impacted by various issues in gastrointestinal tract, stomach, substance digestion and absorption, swallowing, or any other gastrointestinal metabolism problems. The formulation or composition in the present invention may be any form or type of composition suitable for mucosal delivery. Such a composition may comprise a nutraceutical, a pharmaceutical, a food supplement or nutritional supplement. In one embodiment, the composition may include any one or any combinations of (i) a nutritional supplement matrix fraction, (ii) a gas fraction, (iii) an enhancer fraction, (iv) a liquid fraction, and (v) a preservative fraction. Optionally, the fractions may be mixed or combined and stored as a mixture before dispensing. In another embodiment, the fractions are made into a suspension, wherein oxygen molecules are co-existed with the suspension for a specific duration of time before being dispensed from a canister. In one embodiment, the composition may be in a compressed state in a canister before being dispensed. In another embodiment, the composition would include any one or any combinations of (i) a nutritional supplement matrix fraction, (ii) a gas fraction, (iii) an enhancer fraction, (iv) a liquid fraction, and (v) a preservative fraction, wherein any one or more of the fractions are mixed or combined and stored separately from a gas fraction before being dispensed. In yet another embodiment, a nutritional supplement is formulated and mixed with the gas fraction. The gas fraction may comprise oxygen and may be mixed with the nutritional supplement, so that oxygen molecules are stably suspended in the nutritional supplement for a specific duration of time. The composition and/or sub-composition may be in a compressed state before being dispensed. The transmucosal delivery may be more efficient when the composition is atomized. It allows the enhancer fraction of the composition to adhere more to the nutritional supplement to the mouth's mucosal membranes.

The following embodiments/examples are included to demonstrate some specifics of the invention. It should be appreciated by those of skill in the art that the techniques disclosed in the examples that follow represent techniques discovered by the inventor to function well in the practice of the present disclosure, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the present disclosure.

FIG. 1 provides one embodiment of a system for transmucosal delivering a liquid composition comprising a liquid nutrient and oxygen in the form of a supplement matrix into a user's mouth. In one embodiment, the system includes a canister 100 that houses both the liquid nutritional supplement and oxygen. In the present embodiment, the supplement matrix is separated into the liquid nutrient portion (LN 102), including an enhancer fraction and a preservative fraction in a liquid form, and a gas faction (104), for example containing oxygen. In the present embodiment, the LN 102 is contained inside of a bag 110.

The bag 110 may be part of the bag-on-valve dispensing systems known in the art for delivering a liquid through a nozzle cap 106. In one of the bag-on-valve dispensing systems, a liquid is stored in a bag connected to a valve inside of a cannister pressurized with a gas. The nozzle cap 106 may have any form, shape or functions known in the art. In an exemplary embodiment, the nozzle cap 106 may atomize the LN 102 with the aid of a pressurizing gas and delivery such atomized LN 102 to the buccal mucosa. In one embodiment, the pressurizing gas is oxygen 104. In other embodiments, the pressurizing gas could be any portion of the gas fraction of the composition. In an embodiment of a single bag-on-valve configuration, the gas fraction of the composition may exit the canister 100 via a bleeder valve 112. This valve allows a small amount of oxygen 104, or other pressurized gas, to exit the canister 100 into the nozzle cap 106. Inside the nozzle cap, the pressurized gas may be mixed with LN 102 along the flow path 108. The canister 100 may be over-pressurized to allow excessive pressurizing gas to escape after partial or complete dispensing of LN 102 contained in the bag 110. The system also maintains sufficient pressure on the bag 110 to dispense proper amount of LN 102.

Figure 2:
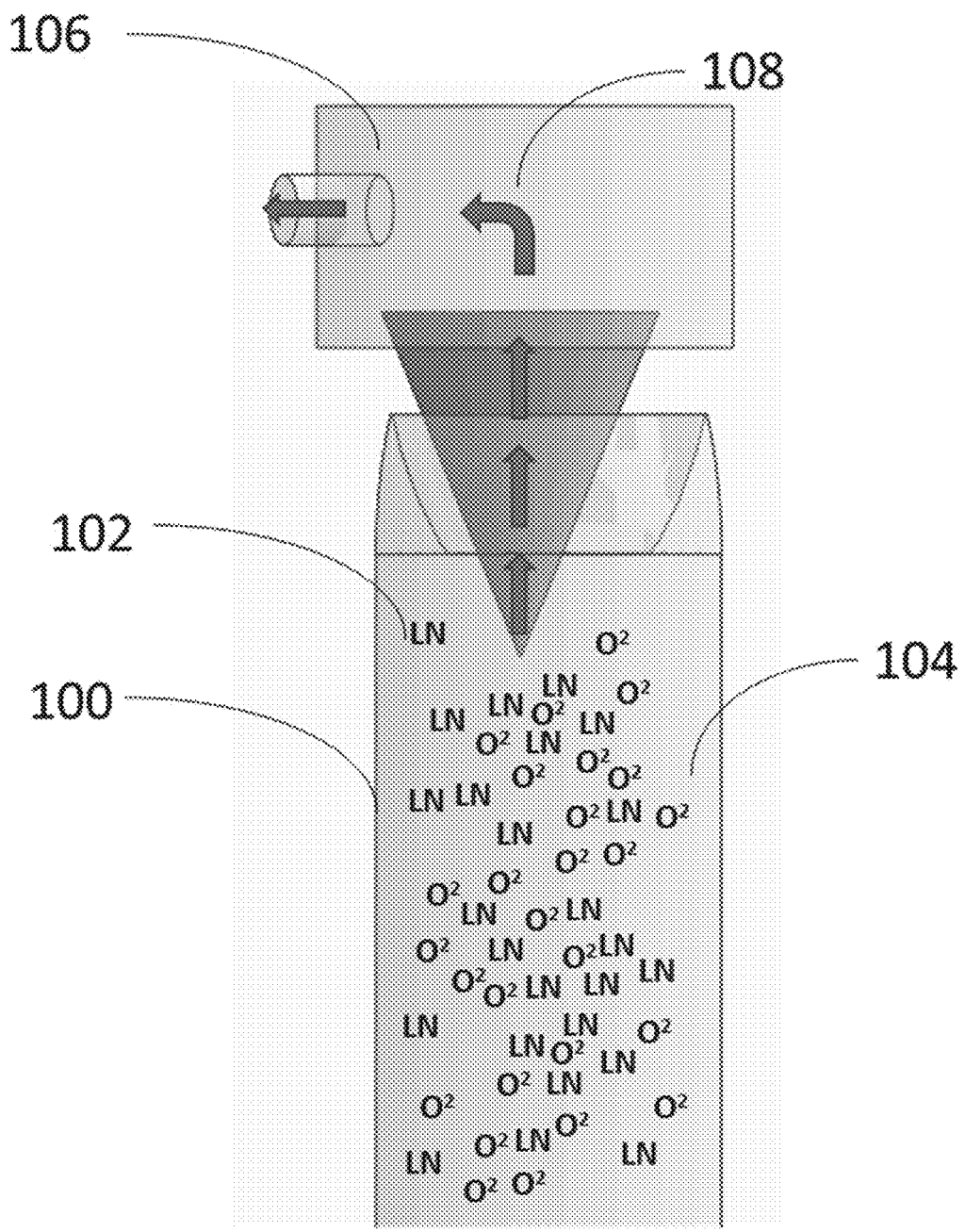
FIG. 2 illustrates a system for mucosa delivery of a mixed composition according to another embodiment of the present invention.

FIG. 2 illustrates an embodiment with mixed contents in a pressurized aerosol container. This embodiment encompasses any system capable for delivering a liquid nutrient (LN) through a pressurized aerosol container. In one embodiment, a propellant gas is mixed with LN to be dispensed, and an atomized cloud of the liquid is propelled along with some of the propellant gas. In one embodiment, the propellant gas is oxygen 104 or some portion of the gas fraction. The oxygen 104 is mixed with LN 102, which comprises, for example, any one or more of a liquid portion, a nutritional supplement matrix, an enhancer portion, and a preservative portion. In other embodiments, the LN 102 may further have a flavoring fraction. When the nozzle cap 106 is compressed, it may release an atomized mixture of LN 102 and the propellant gas oxygen 104 along the flow path 108 in a manner that allows the user to direct the spray onto their buccal mucosa. In some embodiments, the ratio of propellant gas to LN 102 may be adjusted based on user's needs. In yet other embodiments, canister 100 may be over pressurized with oxygen 104 so that when LN 102 is fully dispensed, the user can use the remaining propellant as an oxygen supplement.

Figure 3:
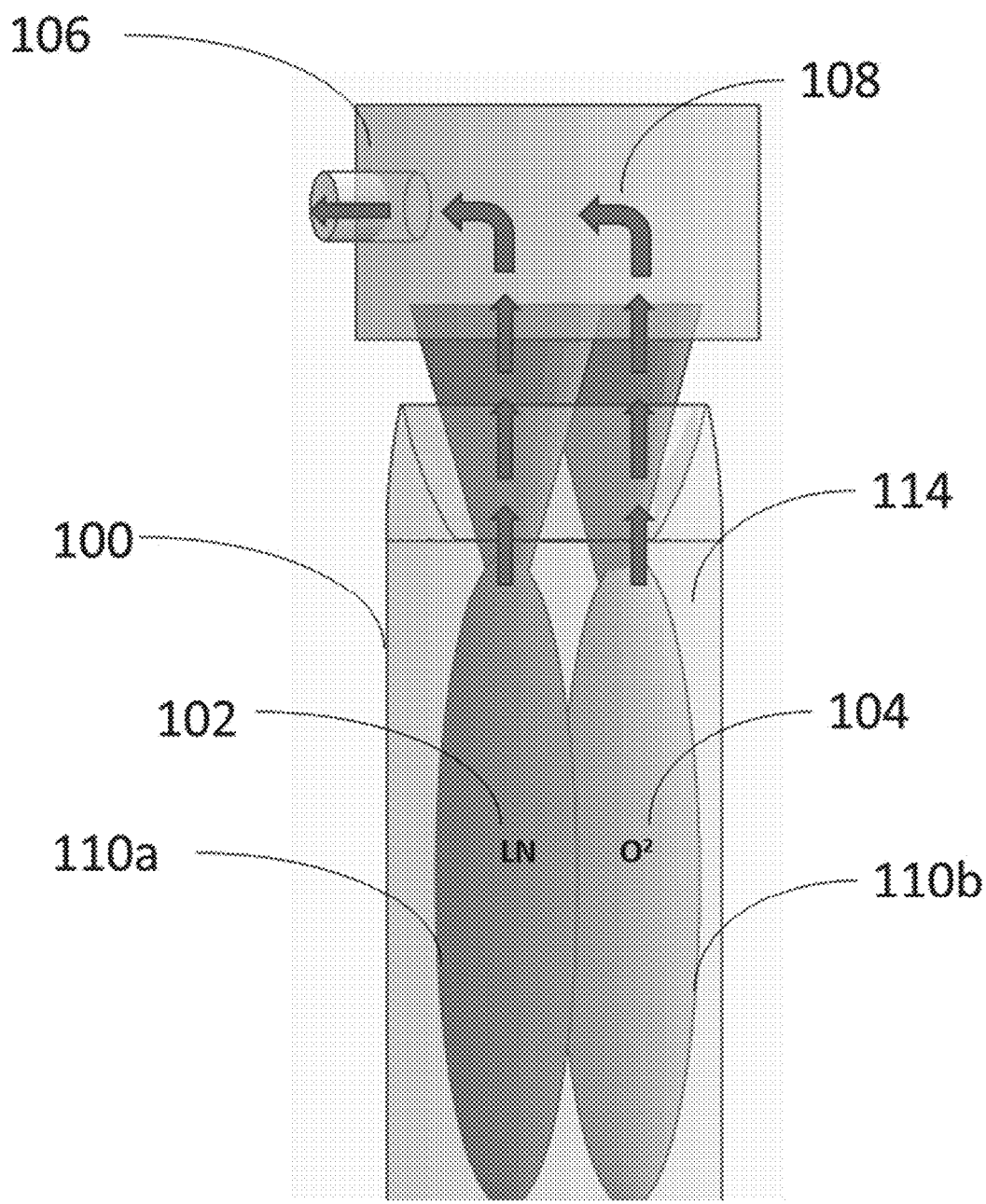
FIG. 3 illustrates a two-bag delivery system according to an embodiment of the present invention.

FIG. 3 illustrates a two-bag system for dispensing the composition. Applicable here are any bag-on-valve systems capable for dispensing atomized liquids and gas, wherein multiple bags hold separate deliverables. In one embodiment, LN 102 is stored in a first bag 110a and the gas fraction, in this case, oxygen 104, is stored in a second bag 110b. Both 110a and 110b are immersed in a pressurizing gas 114. When the nozzle cap 106 is activated, some portion of LN 102 and oxygen 104 are dispensed along the flow path 108 in a form of an atomized spray. A user may direct such spray to the buccal mucosa in their mouth. Such two-bag system may be desirable for keeping oxygen 104 separated from LN 102, to prevent the undesired oxidation of one or more components in LN 102. In some embodiments, the LN 102 and the oxygen 104 are released in equal volumes across the flow path 108 through the nozzle cap 106 and onto the user's buccal mucosa. In other embodiments, the ratio of LN 102 to oxygen 104 can vary depending upon a user's individual needs. For example, if a user exercises at a high elevation, he or she may benefit from a composition having a greater oxygen 104 content than LN 102. In other embodiments, a user may benefit from a composition having a greater LN 102 content than oxygen 104 when exercising in a high-temperature and low humidity environment. In other embodiments, the system of the present invention may comprise more than two bags 110.

Figure 4:
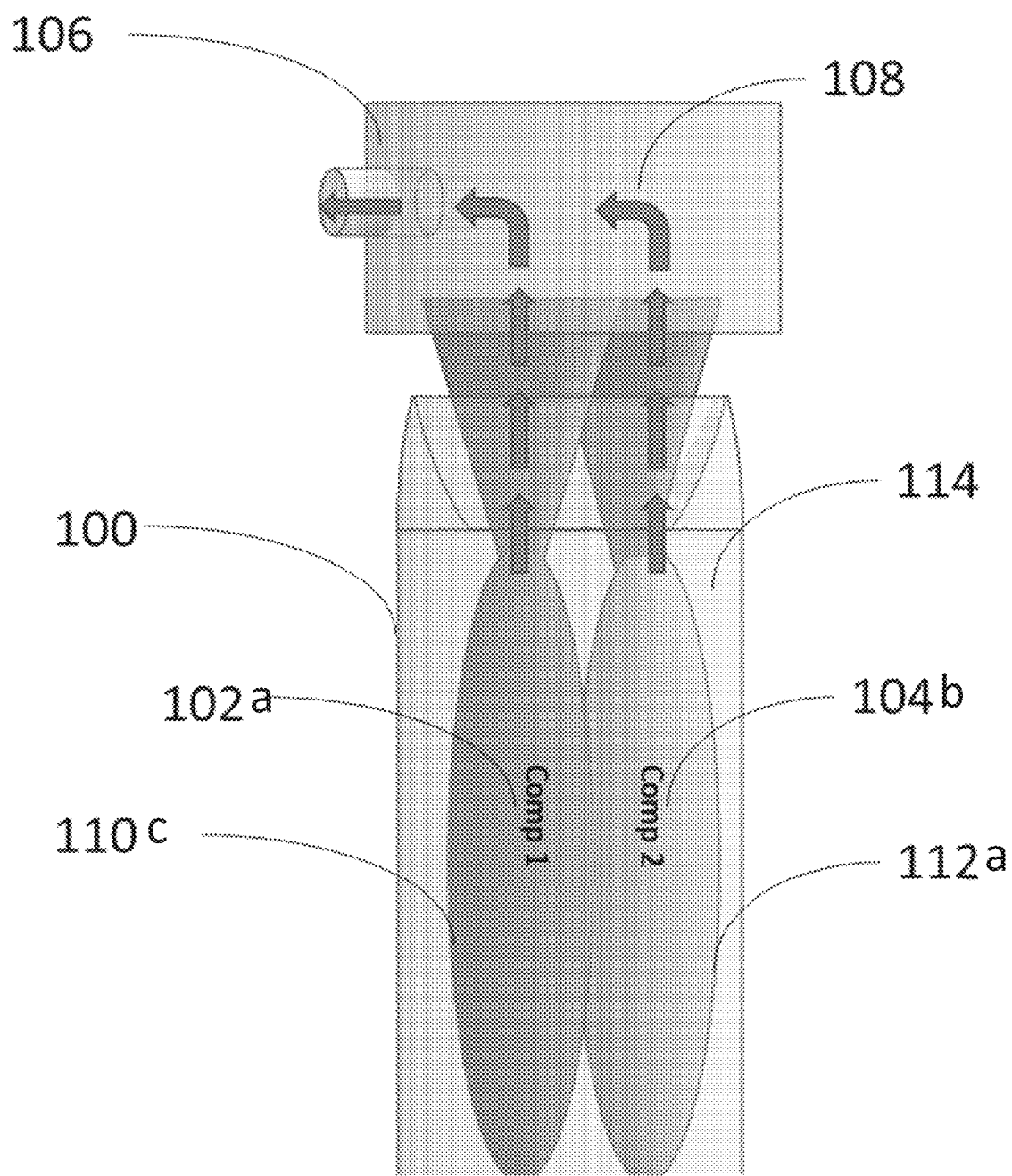
FIG. 4 illustrates a system for mucosa delivery of two compositions admixed right before dispensing according to an embodiment of the present invention.

FIG. 4 provides one embodiment of a mucosa delivery system. It delivers a composition comprises both nutritional supplements and oxygen. The system may comprise a canister 100 that houses the composition. The composition may comprise two separate sub-compositions, 102a (Comp 1) and 104b (Comp 2). Each sub-composition 102a or 104b may independently comprise any one or any combinations of (i) a nutritional supplement matrix fraction, (ii) a gas fraction, (iii) an enhancer fraction, (iv) a liquid fraction, and (v) a preservative fraction. These fractions may optionally be mixed or combined and stored safely in two separate housing or container 110c or 112a. Housing 110c and 112a may be in the form of a bag. The system may comprise bag-on-valve systems for dispensing atomized liquids and gas, in which multiple bags hold separate deliverables. In one embodiment, the first composition 102a is housed in a first bag 110c, and the second composition 104b is housed in a second bag 112a. Both 110c and 112a are immersed in a pressurizing gas 114. Such a two-bag embodiment may be desirable for several reasons. In one embodiment, the gas fraction itself may be the sub-composition 102a, and the remainder of the fractions may be sub-composition 104c. Separating the two sub-compositions may extend the shelf-life if one or both sub-compositions are prone to oxidation.

In one embodiment, the enhancer fraction may be the sub-composition 102a to prevent a mucoadhesive, such as pectin, contained in sub-composition 104b from agglomerating with the nutritional supplement fraction in sub-composition 102a. In another embodiment, the gas fraction, or another pressurized gas, maybe in sub-composition 102a along with one or more other fractions to allow sub-composition 102a and sub-composition 104b to reach similar pressure. This arrangement may facilitate the store of a mucoadhesive or permeation enhancer, such as glycerol, under pressure. Storing under elevated pressure may help achieving a roughly equal level of atomization in sub-composition 102a and sub-composition 104b. In yet another embodiment, sub-composition 102a and sub-composition 104b may have different viscosities. Thus, it is desirable to house them under different pressures, so they can be propelled at the same rate. For example, a flavoring agent may be part of the enhancer fraction and is typically more viscous. In one embodiment, sub-composition 102a may be an aqueous solution, and sub-composition 104b may be an oil-based solution. The two compositions would need to be emulsified to be stored together. In one embodiment, one or more of the ingredients may be oxygenated. For example, if a flavoring agent is prone for oxidation degradation, better to keep it separated from the other fractions in the composition, and such separation can be easily achieved through making it as sub-composition 102a or 104b. In another embodiment, housing 110c and 112a may be chambers, not bags. For example, one system may have two attached canisters 100 that are used together with a single nozzle cap 106. In one embodiment, housing 110c and 112a may be made of the same or different materials compatible with the compositions housed therein. In one embodiment, housing 110c and 112a may be in different sizes. Different sized 110c and 112a would facilitate the delivery of different volumes due to the different dosing needs. Housing 110c and 112a may have different valves to control the release volume. The nozzle cap 106 may be in any shape, form or size known in the art. In one embodiment, when the nozzle cap 106 is activated, at least some portion of sub-composition 102b and sub-composition 104b may be atomized and delivered through the flow path 108, to the oral mucosa. In one embodiment, a portion of the pressurized gas 114 may be released when the nozzle cap 106 is activated.

Figure 5:
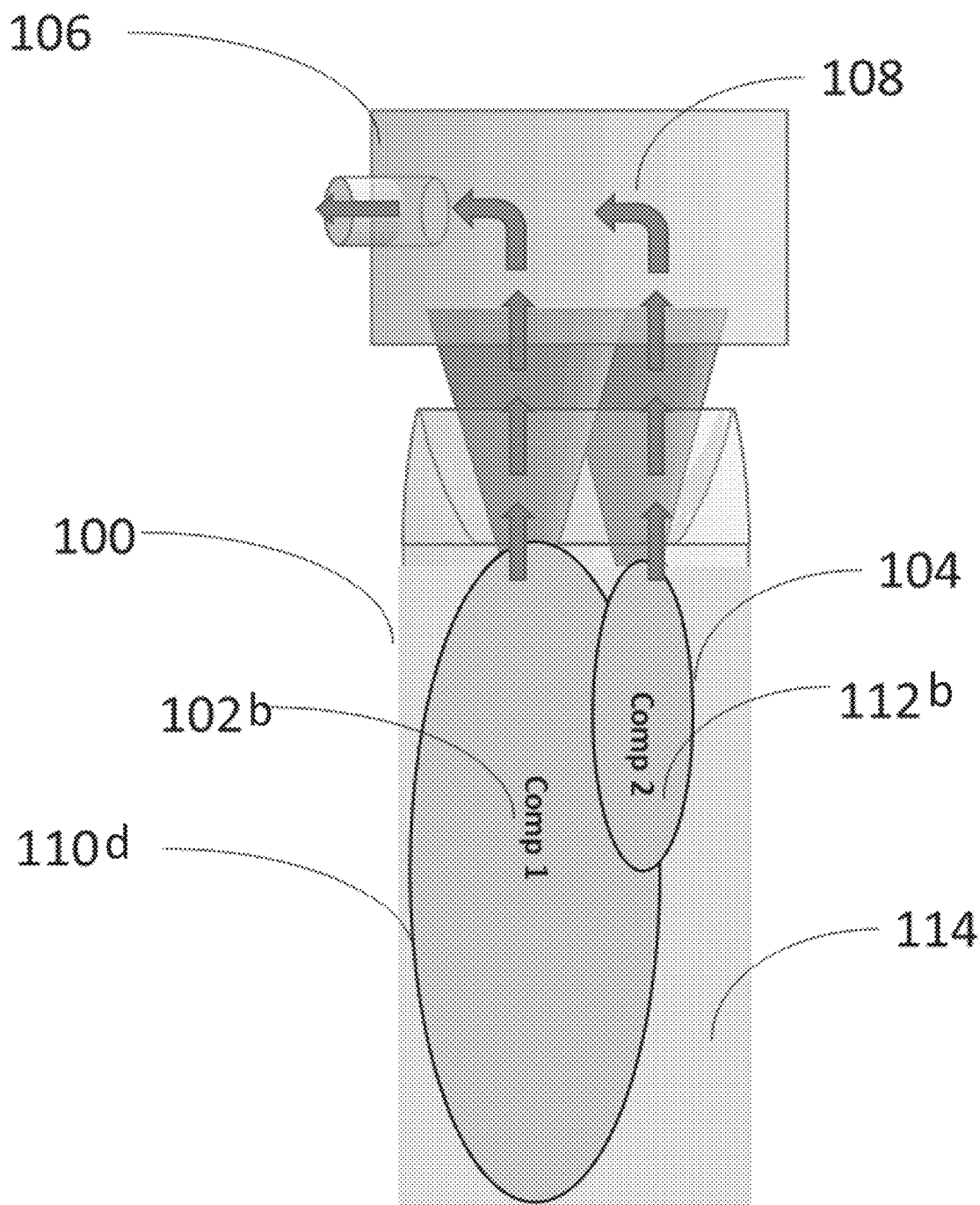
FIG. 5 illustrates a system for mucosa delivery of two compositions housed in two bags with different sizes according to an embodiment of the present invention.

FIG. 5 illustrates one embodiment of the present invention, wherein the bags 110d and 112b have different sizes. In one embodiment, bag 110d may be larger than bag 112b, because it is desired to deliver a larger volume of the sub-composition 102b in a single spray than that of the sub-composition 104b. For example, sub-composition 104b may contain an oxygenated flavoring agent, and only 10% of this sub-composition is needed in the final composition. In other words, 90% of the final composition is from sub-composition 102a. To achieve this goal, 110c maybe nine times bigger than that of 112a. By adjusting sizes of 110d and 112b, the final makeup of the composition may be varied by allowing sub-compositions to be mixed in different volumes.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

The terms "or" and "and/or," as used herein, are to be interpreted as inclusive or meaning any one or any combination. Therefore, "A, B or C" or "A, B and/or C" mean any of the following: "A," "B" or "C"; "A and B"; "A and C"; "B and C"; "A, B and C." An exception to this definition will occur only when a combination of elements, functions, steps or acts are in some way inherently mutually exclusive.

The terms "comprising," "including" and "having" are used interchangeably in this disclosure. The terms "comprising," "including" and "having" mean to include, but not necessarily be limited to the things so described. The terms "about" or "approximately," as used in the application and claims, should be understood to include the recited values or a value that is three times greater or one third of the recited values.

What is claimed is:

1. A system for delivering a composition to an oral mucosa, comprising;
    a canister comprising at least two chambers, wherein the canister houses a pressurized gas and at least one sub-composition including a nutritional supplement fraction and an enhancer fraction, the enhancer fraction comprising a mucoadhesive enhancer or an absorption enhancer;
    wherein the canister dispenses at least a portion of the pressurized gas in an atomized mixture with the sub-composition; and
    wherein the pressurized gas or the sub-composition comprises oxygen.

2. The system of claim 1, wherein the system further comprises a nozzle and at least one valve, wherein the nozzle and the at least one valve is attached to the canister in a way so that the sub-composition is atomized when the nozzle is activated.

3. The system of claim 2, wherein at least a portion of the pressurized gas is admixed with the sub-composition when the nozzle is activated.

4. The system of claim 1, wherein the canister comprises at least one chamber; and wherein the at least one chamber houses the at least one sub-composition.

5. The system of claim 1, wherein the pressurized gas and the sub-composition are housed separately in the at least two chambers.

6. The system of claim 1, wherein the pressurized gas comprises oxygen.

7. The system of claim 1, wherein the sub-composition comprises a nutritional composition, a micronutrient composition, a nutraceutical composition, a pharmaceutical composition, a food composition, a food supplement composition, or any combinations thereof.

8. The system of claim 1, wherein the sub-composition is in the form of a liquid, a suspension, an emulsion, or a solution.

9. The system of claim 1, wherein the sub-composition further comprises any one or any combinations of
    (i) a gas fraction;
    (ii) a liquid fraction; or
    (iii) a preservative fraction.

10. The system of claim 1, wherein upon activation, the nozzle delivers the composition comprising the pressurized gas admixed with the atomized sub-composition right before the composition is delivered to the oral mucosa.

11. A system for delivering a composition to an oral mucosa, comprising
    a canister comprising at least two chambers, wherein the canister houses at least two sub-compositions;
    at least one valve allowing the passing of the at least two sub-compositions, wherein one or both of the at least two sub-compositions includes a nutritional supplement fraction and an enhancer fraction, the enhancer fraction comprising a mucoadhesive enhancer or an absorption enhancer; and
    a nozzle allowing the at least two sub-compositions to be admixed and dispensed to the oral mucosa;
    wherein one of the at least two sub-compositions comprises a gas fraction; and
    wherein the gas fraction comprises oxygen.

12. The system of claim 11, wherein the other of the at least two sub-compositions further comprises independently any one or more of
    (i) a liquid fraction; or
    (ii) a preservative fraction.

13. The systems of claim 12, wherein the gas fraction comprises oxygen and is admixed with the other of the at least two sub-compositions.

14. The system of claim 11, wherein the canister comprises at least one chamber; and wherein the at least one chamber houses one of the at least two sub-compositions.

15. The system of claim 14, wherein the at least one chamber is connected to the at least one valve.

16. The system of claim 11, wherein the at least two sub-compositions comprise independently a nutritional composition, a micronutrient composition, a nutraceutical composition, a pharmaceutical composition, a food composition, a food supplement composition, or any combinations thereof.

17. The system of claim 11, wherein the at least two chambers house the at least two sub-compositions separately.

18. The system of claim 11, wherein the nozzle atomizes at least one of the at least two sub-compositions when being activated.

19. The system of claim 11, wherein the canister houses a pressurized gas.

20. The system of claim 11, wherein upon activation, the nozzle delivers the composition comprising the at least two sub-compositions admixed right before the composition is delivered to the oral mucosa.

* * * * *